Oct. 5, 1965 I. KAMEN 3,210,472

INTERROGATING SYSTEM RESPONSE ARRANGEMENT

Filed Dec. 4, 1962 4 Sheets-Sheet 1

INVENTOR.
Ira Kamen

BY

Michael S. Striker
Atty

INTERROGATING SYSTEM RESPONSE ARRANGEMENT

Filed Dec. 4, 1962 4 Sheets-Sheet 2

INVENTOR
Ira Kamen
BY
Michael S. Striker
Atty

INTERROGATING SYSTEM RESPONSE ARRANGEMENT

Filed Dec. 4, 1962 4 Sheets-Sheet 3

INVENTOR.
Ira Kamen
BY
Michael S. Striker
Atty

INTERROGATING SYSTEM RESPONSE ARRANGEMENT

Filed Dec. 4, 1962 4 Sheets-Sheet 4

INVENTOR.
Ira Kamen

BY

Michael S. Striker
Atty 3,210,472
INTERROGATING SYSTEM RESPONSE ARRANGEMENT

Ira Kamen, New York, N.Y., assignor to Teleglobe Pay-TV-System, Inc., New York, N.Y.
Filed Dec. 4, 1962, Ser. No. 242,202
The portion of the term of the patent subsequent to Mar. 24, 1981, has been disclaimed
10 Claims. (Cl. 179—2)

The present invention relates to an interrogating system response arrangement. More particularly, the present invention relates to an interrogating system for taking opinion and rating polls. The interrogating system of the present invention is especially adaptable and suitable for use in polling a television and/or radio audience, although it may be utilized for any desired type of polling with any desired population segment.

Presently utilized rating techniques, utilized especially for rating television programs, are defective in that they indicate only what channel is viewed by the questionee at a particular time. These rating techniques do not indicate who is watching the television program, such as, for example, the entire family, the man of the household, the woman of the household, or a child or children of the household. Furthermore, the persently utilized techniques for rating television programs do not indicate whether or not the rated program was enjoyed by the questionee and certainly do not indicate whether the commercial was viewed or whether or not the commercial message was understood and/or appreciated by the questionee. It is obvious that an opinion gathering, rating or polling system which merely indicates that a certain number of people answered the telephone when called by the rating service and stated that they were watching an identified television program leaves much to be desired. A television program sponsor may determine only that a given number of people stated that they watched his program. Many people do not watch the entire program. Many people do not watch the commercials. Many people may be irritated at being disturbed by a phone call and may not truthfully answer questions put to them.

The principal object of the present invention is to provide a new and improved interrogating system.

An object of the present invention is to provide a new and improved rating or opinion gathering system which may be utilized in conjunction with television and radio programs.

Another object of the present invention is to provide a new and improved interrogating system response arrangement.

Another object of the present invention is to provide an interrogating system which functions efficiently and reliably to provide a considerable amount of opinion data.

Another object of the present invention is to provide an interrogating system which utilizes telephone lines and simple and inexpensive components to provide efficient and reliable opinion data.

Another object of the present invention is to provide an interrogating system which is readily and facilely utilized by both the interrogator and the questionee.

Another object of the present invention is to provide an interrogating system which functions efficiently and effectively to provide opinion data in a minimum of time.

In accordance with the present invention, the interrogating system enables a great number of people to be questioned at the same time and provides each questionee with equipment which enables him to provide a great deal of data to the interrogator. Thus, for example, each person questioned may provide any one of ten different responses to each question asked by the interrogator. The questionee may thus indicate, in response to the appropriate questions, which of ten television channels or radio stations he is watching or listening to, what his opinion of the program watched or listened to is. That is, he may indicate by any of ten different descriptive terms what he thinks of the program. He may say, through a binary code transmission system, that in his opinion the program is excellent, very good, good, fair, passable, poor, bad, very bad, disgracefully bad or that he doesn't care to venture an opinion. Furthermore, the questionee may indicate who in his household is watching the indicated program. That is, he may select any of ten possible descriptions for the viewers in his home, such as the whole family, the man of the household, the woman of the household, the man and woman of the household, the boy of the household, the girl of the household, the boy and girl of the household, and other possible combinations.

The interrogating system response arrangement of the present invention includes a ten position signalling device which may be utilized by the questionee to transmit data requested by the interrogator to a central station where the data is compiled and analyzed.

In order that the present invention may be readily carried into effect, it will now be described with reference to the accompanying drawings, wherein.

In the figs., the same components are identified by the same reference numerals.

Figure 1:
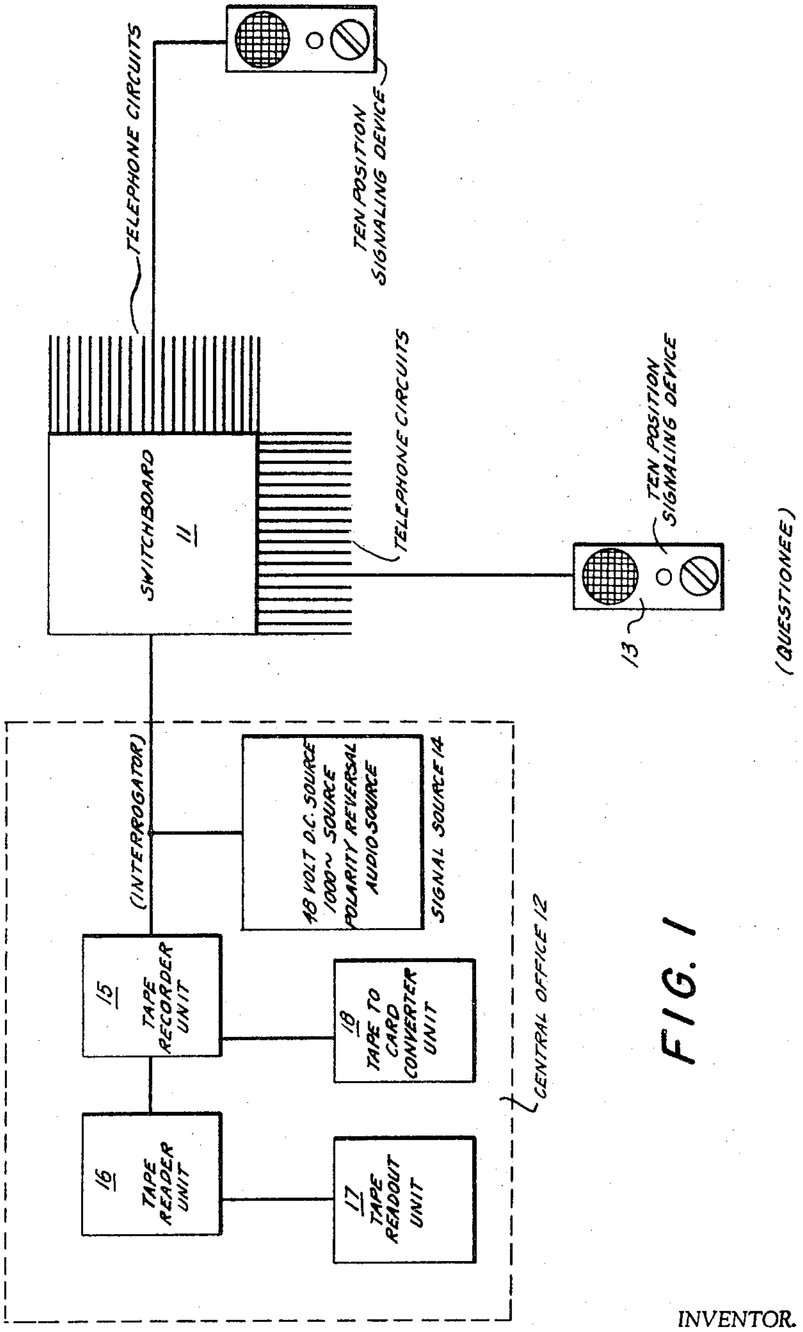
FIG. 1 is a schematic block diagram of an embodiment of the interrogating system of the present invention.

In FIG. 1, a switchboard 11 may comprise any suitable known automatic switchboard or switchboard scanner assembly. A suitable switchboard scanner assembly which may be utilized is that manufactured by the General Telephone Company. The switchboard scanner or switchboard 11 functions to direct traffic in audio, power and data signals and selectively connects a central office or station 12 with a plurality of ten position signalling devices, such as, for example, the signalling device 13. A sequential scanning switchboard assembly of the type utilized is designed to feed sequentially perforated tape readouts.

As many as 5000 lines may be selectively controlled by the switchboard 11 and a signalling device, such as the signalling device 13, may be connected to each of these lines. The switchboard 11 selects the signalling devices to be interrogated and then functions as an interrogator by sending an initial signal to the selected signalling devices and by closing a circuit between each of the selected signalling devices and the central office 12.

An interrogating system response arrangement may be installed in the household of each prospective questionee. The interrogating system response arrangement of the present invention comprises a ten position signalling device, such as the signalling device 13, and may be utilized by the questionee to communicate with the central office 12. The central office 12 comprises any suitable equipment for transmitting interrogation or power signals and audio signals through the switchboard to the signalling devices and for recording, indicating and analyzing data signals received from the various signalling devices through the switchboard 11.

The function of the central office 12 is to contact selected prospective questionees by signalling the response arrangements in their households. This contact is made by interrogation signals transmitted from a signal source 14 which may comprise any suitable arrangement for providing a D.C. voltage, a signal or tone of a specific frequency, audio signals and an arrangement for reversing the polarity of the D.C. signal. These functions are provided by any suitable arrangements of known equipment. Thus, for example, the D.C. voltage may be provided by a suitable battery arrangement, the signal or tone of a specific frequency may be provided by a suitable signal generator or oscillator arrangement, the audio signals may be provided by a microphone and amplifier arrangement and the polarity reversal of the D.C. signal may be provided by any suitable switching arrangement.

The function of the central office 12 is also to record data transmitted to it from the questionee and to indicate and analyze such data. The recording, indication and analysis of received data from the various selected signalling devices is achieved by any known suitable equipment, such as, for example, a tape recorder unit 15, a tape reader unit 16, a tape readout unit 17 and a tape to card converter unit 18.

The tape recorder unit 15 may, of course, be a disc recorder unit or drum recorder unit, as well. The tape recorder unit 15 may function to mechanically record the received data by means of perforations in a tape or may function to magnetically record the received data by means of magnetization of a tape, disc, drum or the like. The tape reader unit 16, of course, functions to read the data recorded by the tape recorder unit 15. Thus, if the data is recorded by perforations in a tape, the tape reader unit 16 senses such perforations, and if the data is magnetically recorded in a tape or the like the tape reader unit functions to sense such magnetization in the usual manner. The tape readout unit 17 functions to provide a visual indication of the data read by the tape reader unit 16 and may comprise any suitable means for such function, such as, for example, Nixie tubes, beam switchers, a Veeder Root counter or a visual indication board of any suitable type. The tape to card converter unit 18 may be utilized to provide a file based on the data received and may comprise any suitable type of tape to card converter.

Figure 2:
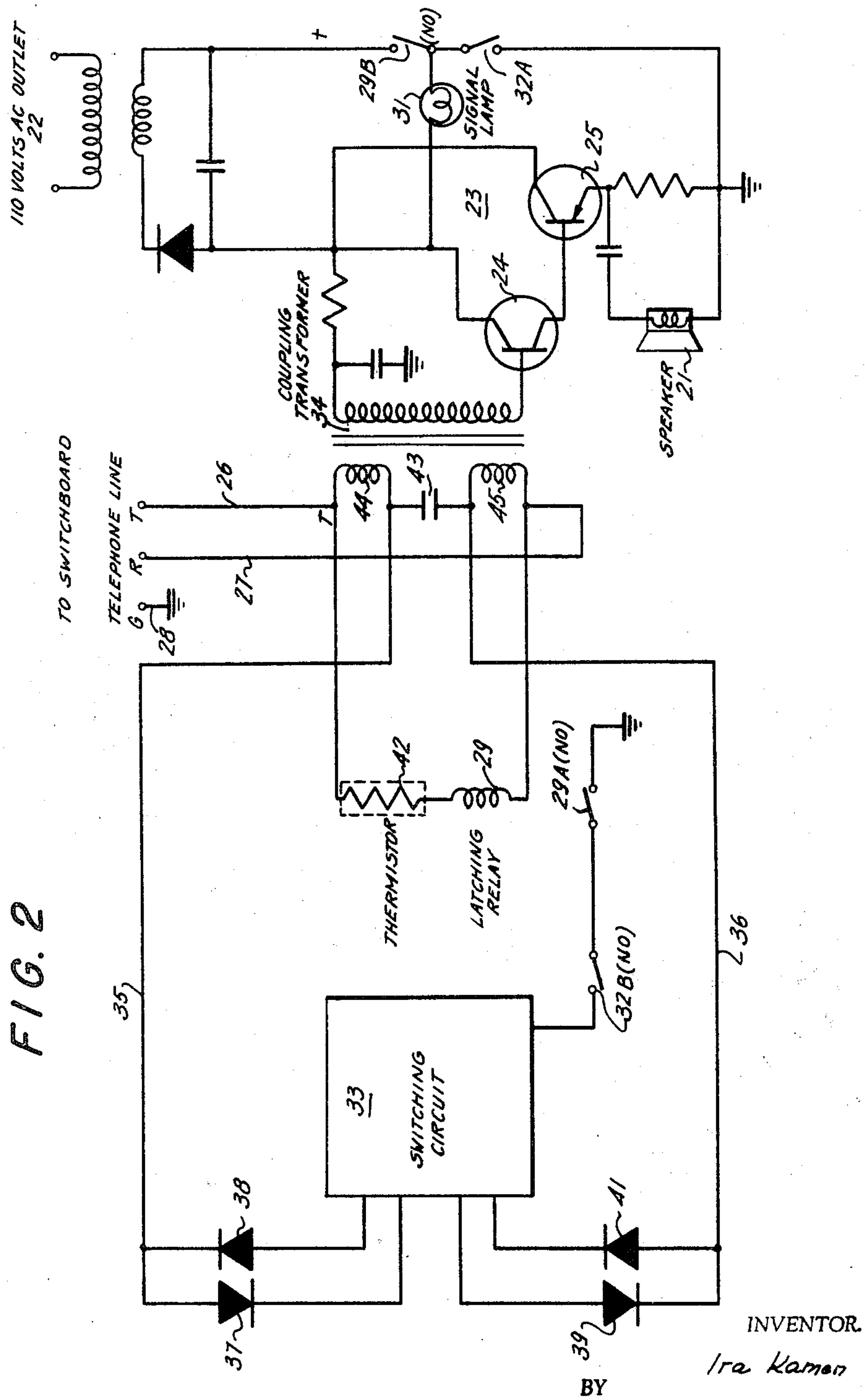
FIG. 2 is a schematic circuit diagram of an embodiment of the interrogating system response arrangement of the present invention.

FIG. 2 is a circuit diagram of an embodiment of the interrogating system response arrangement of the present invention and comprises a ten position signalling device, such as the signalling device 13 of FIG. 1. In the embodiment of FIG. 2, a speaker 21, which is utilized to question the questionee, is energized from a normal household A.C. power outlet 22 of about 110 volts A.C. The speaker 21 is energized through an amplifier circuit 23 which comprises two transistors 24 and 25 connected in tandem in grounded emitter circuit arrangement.

A telephone circuit of the usual type, comprising Tip, Ring and Ground lines, is provided in the usual manner in the household of the questionee. The Tip line 26, the Ring line 27 and the Ground line 28 extend from the switchboard 11 (FIG. 1) and are available in the household of the questionee in the usual telephone outlet device.

When the central office 12 wishes to obtain the opinion or other information of a questionee, it transmits from the signal source 14, a 48 volt D.C. signal via the Tip, Ring and Ground lines of the telephone circuit. The 48 volt signal energizes a latching relay 29 which when energized closes normally open contacts 29A and 29B. The closing of the normally open contact 29B by the relay 29 closes the circuit of the signal lamp 31. The signal lamp 31 is then energized and indicates to the questionee that the central office 12 wishes to communicate with him. The lamp 31 may, of course, comprise any suitable visual or audible signal device and need not necessarily be a lamp.

When a person having the response arrangement of the present invention in his home is aware that the signal lamp 31 or other suitable indicating device is advising him that the central office 12 wishes to communicate, he may, if he so wishes, close switches 32A and 32B, which are preferably ganged together. The closing of the switch 32A closes the circuit of the speaker 21 so that it is energized. The closing of the switch 32B closes a ten position signalling device or switching circuit 33 to ground so that said switching circuit is energized and in operable condition.

The central office may then transmit audio signals via the telephone Tip and Ring lines 26 and 27, a coupling transformer 34, the transistor amplifier 23 and the interconnecting circuitry to the speaker 21. The interrogator at the central station 12 may thus speak to the questionee and advise him of the procedure. He may ask the questionee to identify himself, to provide an opinion on a specific question, to provide an opinion of a specific television or radio program, to indicate what general area he lives in, to indicate what his environmental living conditions are, to indicate his professional status, to indicate his sociological status, to indicate his political status, and to derive a great deal of desired data and information from the questionee. The questionee may then respond to the various questions put to him via the speaker 21 by means of the switching circuit 33.

Figure 6:
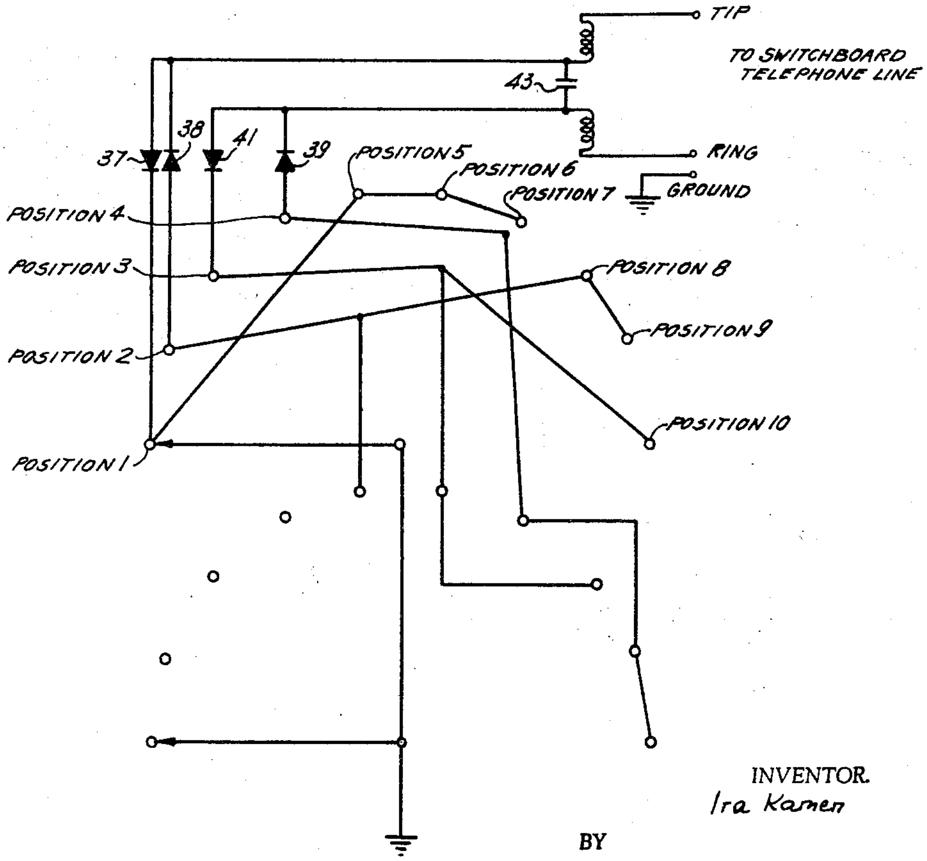
FIG. 6 is a circuit arrangement which may be utilized as the ten position signalling device or switching circuit of FIGS. 2 and 3.

The ten position signalling device or switching circuit 33 comprises a suitable circuit arrangement for providing a selected one of ten possible signals and for transmitting the selected signal to the central station 12 via the switching circuit output line 35, the Tip line 26 of the telephone circuit, the switching circuit output line 36, the Ring line 27 of the telephone circuit and the switchboard 11 (FIG. 1). The switching circuit 33 may include, for example, the opinion response line switching unit described in my copending patent application Serial No. 161,197, filed December 21, 1961, now Patent No. 3,126,513, granted March 24, 1964. The opinion response line switching unit of FIG. 6 of my copending patent application Serial No. 161,197 is preferably modified to provide ten different signals to the central office 12. A circuit arrangement which may be utilized as the ten position signalling device or switching circuit 33 is shown in FIG. 6.

The switching circuit 33 includes a ten position switch (FIGS. 4, 5 and 6) which permits the questionee to select one of ten different signals to be transmitted to the central office 12. In a first position of the ten position switch, as described in said copending patent application, a positive signal relative to ground may be transmitted through the Tip line 26 to the central office 12. In a second position of the ten position switch, as described in said copending patent application, a negative signal relative to the ground may be transmitted through the Tip line 26 to the central office 12. In a third position of the ten position switch, as described in said copending patent application, a positive signal relative to ground may be transmitted through the Ring line 27 to the central office 12. In a fourth position of the ten position switch, as described in said copending patent application, a negative signal relative to ground may be transmitted through the Ring line 27 to the central office 12.

In a fifth position of the ten position switch, a positive signal relative to ground may be transmitted through the Tip line 26 simultaneously with a positive signal relative to ground transmitted through the Ring line 27 to the central office 12. In a sixth position of the ten position switch, a negative signal relative to ground may be transmitted through the Tip line 26 simultaneously with a negative signal relative to ground transmitted through the Ring line 27 to the central office 12. In a seventh position of the ten position switch, a positive signal relative to ground may be transmitted through the Tip line 26 simultaneously with a negative signal relative to ground transmitted through the Ring line 27 to the central office 12. In an eighth position of the ten position switch, a negative signal relative to ground may be transmitted through the Tip line 26 simultaneously with a positive signal relative to ground transmitted through the Ring line 27 to the central office 12. In a ninth position of the ten position switch, a positive signal relative to ground may be transmitted simultaneoeusly with a negative signal relative to ground through the Tip line 26 to the central office 12. In a tenth position of the ten position switch, a positive signal relative to ground may be transmitted simultaneously with a negative signal relative to ground through the Ring line 27 to the central office 12. If the positive signal relative to ground is more positive than the negative signal relative to ground is negative or if the negative signal relative to ground is more negative than the positive signal relative to ground is positive, then the ninth and tenth signals may be distinguished from the previous eight signals.

The diodes of the opinion response line switching unit of my copending patent application Serial No. 161,197 are indicated in FIG. 2 as diodes 37, 38, 39 and 41. The first diode 37 is connected in a positive conducting direction relative to ground from the Tip line 26, via the switching circuit output line 35, to the ten position switch of the switching circuit 33. The second diode 38 is connected in a negative conducting direction relative to ground from the Tip line 26, via the output line 35, to the ten position switch of the switching circuit 33. The third diode 39 is connected between the Ring line 27 and the ten position switch of the switching circuit 33, via the output line 36, in a negative conducting direction relative to ground. The fourth diode 41 is connected between the Ring line 27 and the ten position switch of the switching circuit 33, via the output line 36, in a positive conducting direction relative to ground.

A variable impedance or resistor 42 is connected in series circuit arrangement with the latching relay 29 between the Tip and Ring lines 26 and 27, respectively. The variable impedance 42 functions to provide enough impedance in the circuit to prevent short-circuiting of the coupling transformer 34. The variable impedance 42 preferably comprises a thermistor of suitable type which functions in a known manner to increase its impedance as the temperature of its environment increases. The impedance of the variable impedance or thermistor 42 is several times greater than that of the latching relay 29.

A blocking capacitor 43 is connected between the input windings 44 and 45 of the coupling transformer 34 in order to isolate the Tip and Ring lines 26 and 27, respectively, to permit the transmission of any of the various ten signals from the interrogating system response arrangement to the central office 12 without interference or adverse influence of the signal in one line on the signal in the other line. The coupling transformer 34 provides a matching impedance for the telephone lines and balances the noise.

If the interrogator wishes to know the status of the questionee, he may first say, via the speaker 21, "If you are married, move your switch to position No. 1. If you are unmarried, move your switch to position No. 2. If you are divorced, move your switch to position No. 3. If you are separated from your spouse, move your switch to position No. 4. Etc., etc."

The interrogator may then ask, "If you are watching the program that is now on channel 11, and if you think that this program is an excellent one, move your switch to position No. 1. If you feel that the program is a very good one, move your switch to position No. 2. If you feel that the program is a good one, move your switch to position No. 3. If you feel that the program is a fair one, move your switch to position No. 4. Etc., etc."

The interrogator may then say, via the speaker 21, "Have you watched the last commercial? If you have, and you feel that it was interesting move your switch to position No. 1. If you have, and you feel that it was so interesting that you are constrained to rush out and buy the product advertised, move your switch to position No. 2. If you have watched the commercial, and feel that it was uninteresting to you, move your switch to position No. 3. If you have not watched the last commercial, move your switch to position No. 4. Etc., etc."

The interrogator may then say, "If you have never finished grade school, move your switch to position No. 1. If you have finished grade school, but not high school, move your switch to position No. 2. If you have finished high school, but have no further formal education, move your switch to position No. 3. If you have finished high school and business school, move your switch to position No. 4. If you have attended college, move your switch to position No. 5. If you have a college Bachelor's degree, move your switch to position No. 6. If you have a graduate degree, such as a Master's degree or a Doctor's degree, or a professional Bachelor's degree, such as M.D. or LL.B., move your switch to position No. 7. Etc., etc."

The interrogator may ask any questions designed to derive opinion data or other desired data and the questionee may answer if he wishes, or answer that he does not wish to answer, or he may refrain from answering altogether. The central office is thus able to compile, analyze and present an enormous amount of opinion data in a minimum period of time which may approximate just a minute or two and may provide statistics for opinion data involving as many as 15,000 people in the time that it would take a telephone interviewing system to derive the opinions and status of one person.

Figure 3:
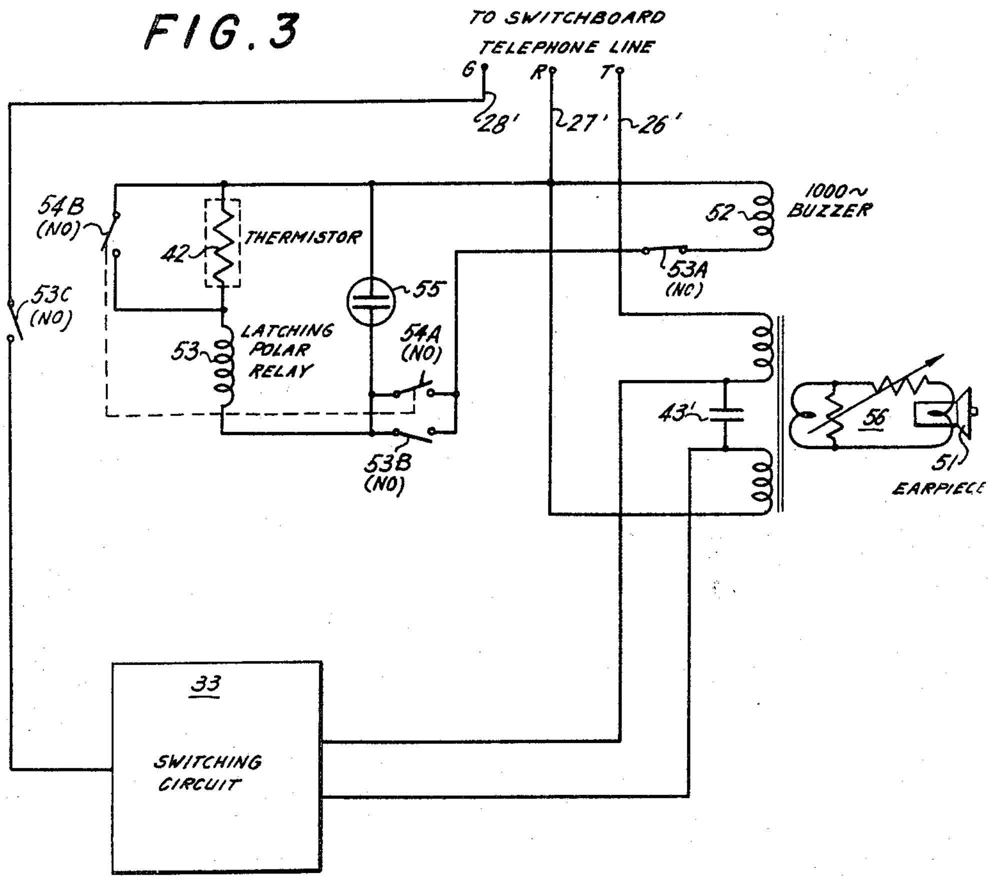
FIG. 3 is a schematic circuit diagram of another embodiment of the interrogating system response arrangement of the present invention.

FIG. 3 is a circuit diagram of another embodiment of the interrogating system response arrangement of the present invention which utilizes the ten position signalling device, such as the signalling device 13 of FIG. 1, as described with reference to the embodiment of FIG. 2. In the embodiment of FIG. 3, however, an earpiece 51 is provided to enable the questionee to be interrogated on a strictly personal basis, without disturbing anyone else in the vicinity. The earpiece 51 is energized on a zero level directly from the telephone circuit, without amplification. The telephone line is the same as that utilized in the embodiment of FIG. 2 and comprises a Tip, Ring and Ground line extending from the switchboard 11 (FIG. 1) to the household of the questionee. The Tip line 26', the Ring line 27' and the Ground line 28' are available in the household of the questionee in the usual telephone outlet device.

When the central office 12 wishes to obtain the opinion or other information of a prospective questionee, it transmits from the signal source 14 a tone of a specific frequency, such as, for example, a 1000 cycle tone, via the telephone lines. The 1000 cycle tone energizes a buzzer 52 via a normally closed contact 53A of a latching polar relay 53. The buzzer 52 may, of course, comprise any suitable visual or audible indicating device and indicates to the questionee that the central office 12 wishes to communicate with him.

When the person having the signalling device in his home is aware that the buzzer 52, or other suitable indicating device, is advising him that the central office 12 wishes to communicate, he may close switches 54A and 54B. The switches 54A and 54B are preferably ganged together. The closing of the switch 54A closes the circuit of a neon lamp 55, so that it is energized. The closing of the switch 54B short-circuits a variable impedance 42′ and closes the circuit of the latching polar relay 53 so that said latching polar relay is energized.

When the latching relay 53 is energized, it opens its normally closed contact 53A and closes its normally open contacts 53B and 53C. The opening of the relay contact 53A opens the buzzer circuit so that the buzzer is deenergized. The closing of the relay contact 53B closes a holding circuit for the latching polar relay 53. The closing of the relay contact 53C closes the switching circuit 33 to ground via the Ground line 28′ of the telephone circuit.

Thus, the neon lamp 55 indicates to the questionee that his signalling device is in operable condition. Of course, any other suitable indicating device may be utilized instead of the neon lamp 55. Similarly to the situation of the embodiment of FIG. 2, when the switching circuit 33 is connected to ground it is in operable condition, since the switching circuit 33 utilized in the embodiment of FIG. 2 is identical to the switching circuit 33 utilized in the embodiment of FIG. 3.

In the embodiment of FIG. 3, either the latching polar relay 53 may be utilized and the polarity of the 48 volts D.C. provided by the signal source 14 at the central station 12 be periodically reversed in polarity, or a stepping relay may be utilized in place of said latching polar relay. The desired function of the relay 53, whether it be a latching polar relay or a stepping relay, is to periodically be energized and deenergized. To achieve this effect with the latching polar relay 53, the polarity of the 48 volt D.C. signal provided by the signal source 14 is periodically reversed by any suitable means in such source. Thus, for example, the intial relay energizing voltage is the 48 volt D.C. signal which may have a positive polarity in the Ring line 27′ and a negative polarity in the Tip line 26′. The latching polar relay 53 does not present any load to the coupling transformer 34′ since the variable impedance or thermistor 42′ is connected into the circuit as a high impedance as soon as the polarity of the 48 volt D.C. signal is reversed so that it is positive in the Tip line 26′ and negative in the Ring line 27′.

The central office 12 may then transmit audio signals via the telephone Tip and Ring lines 26′ and 27′, the coupling transformer 34′ and the interconnecting circuitry to the earpiece 51. When the 48 volt D.C. signal is reversed in polarity, the latching polar relay 53 is no longer energized so that the thermistor 42′ is no longer short-circuited and presents a very high impedance to the audio signal transmitted from the central office 12 so that the only signal picked up by the coupling transformer 34′ is the audio signal.

It is thus seen that once the buzzer 52 circuit is initially closed through the normally closed relay contact 53A, a 1000 cycle tone transmitted from the central office 12 will energize the buzzer to advise the questionee that he is to be interrogated. A 48 volt D.C. signal of positive polarity in the Ring line 27′ and negative polarity in the Tip line 26′ will then energize the neon lamp 55 and the latching polar relay 53 upon the closing of the manually operated switches 54A and 54B. The energization of the latching polar relay 53 will then close the holding circuit of said relay through its contact 53B and will place the switching circuit 33 in operable condition by grounding it through the relay contact 53C. When the central office 12 initiates its audio signal transmission, the signal source 14 of said central office will reverse the polarity of the 48 volt D.C. This causes the deenergization of the latching polar relay 53, since such relay is polarized for operation on only one polarity of impressed voltage. Upon deenergization of the latching polar relay 53, the relay contact 53A closes to close the buzzer 52 circuit, but the buzzer is not energized since it responds only to a 1000 cycle signal. The deenergization of the latching polar relay 53 opens the relay contact 53B to open the relay holding circuit and opens the relay contact 53C to disconnect the switching circuit 33 from ground. Thus, the arriving audio signal is reproduced by the earpiece 51 without difficulty.

The interrogator at the central station 12 may thus speak to the questionee in the same manner as is the case in the embodiment of FIG. 2, and when he desires a response from the questionee he ceases his audio transmission, and again reverses the polarity of the 48 volt D.C. signal so that the latching polar relay 53 is energized with the aforedescribed results and the switching circuit 33 is connected to ground through the relay contact 53C. The questionee is advised of this fact by the energization of the neon lamp 55 and may then respond, by means of the switching circuit 33, to the various questions put to him by the interrogator via the earpiece 51.

The switching circuit 33 is identical to the switching circuit 33 utilized in the embodiment of FIG. 2 and therefore functions in the identical manner as described with relation to FIG. 2.

The variable impedance 42′ is similar to the variable impedance 42 of the embodiment of FIG. 2 and functions in a similar manner, as described with reference to FIG. 2. The blocking capacitor 43′ is similar to the blocking capacitor 43 of FIG. 2 and functions in a similar manner, as described with reference to FIG. 2. The coupling transformer 34′ provides a matching impedance for the telephone lines and balances the noise. A volume control 56 may be provided to permit the adjustment of the volume of sound reproduced by the earpiece 51.

Figure 4:
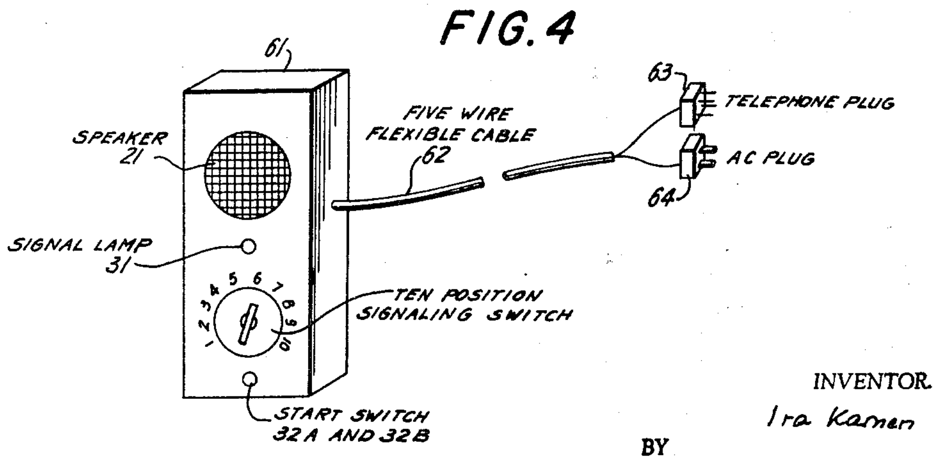
FIG. 4 is a perspective view of an embodiment of a housing for the circuit arrangement of FIG. 2.

FIG. 4 is a perspective view of an embodiment of a housing for the circuit arrangement of FIG. 2. Since the circuit arrangements of the embodiments of FIGS. 2 and 3 are simple and compact, they may be readily housed in compact housings having dimensions of a few inches. A housing 61 of FIG. 4 may thus house the circuit arrangement of FIG. 2 in such a manner that the speaker 21, the signal lamp 31, the start switch for manually operating the switches 32A and 32B and the ten position signalling switch are all readily available to the questionee. The housing 61 is compact and of light weight and need merely be plugged into the usual telephone outlet and the household A.C. power outlet via a five wire flexible cable 62 through which the telephone lines and the A.C. power lines extend and terminate in a telephone plug 63 and a power plug 64.

Figure 5:
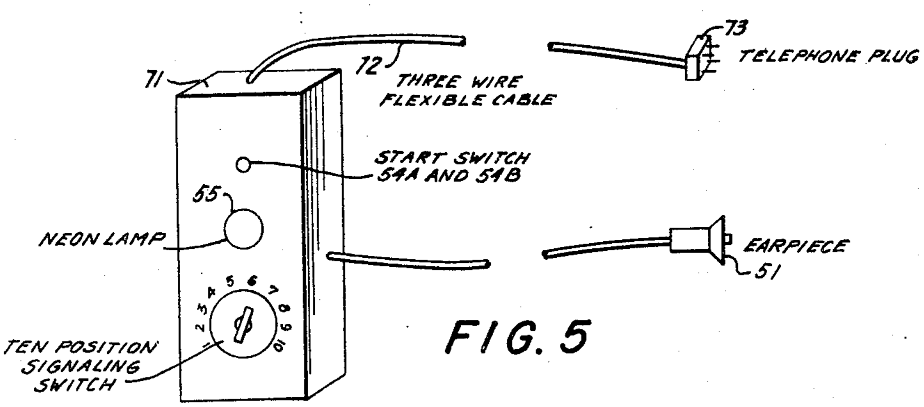
FIG. 5 is a perspective view of an embodiment of a housing for the circuit arrangement of FIG. 3.

FIG. 5 is a perspective view of an embodiment of a housing for the circuit arrangement of FIG. 3. A housing 71 of FIG. 5 may thus house the circuit arrangement of FIG. 3 in such a manner that the earpiece 51, the start switch for manually operating the switches 54A and 54B, the neon lamp 55 and the ten position signalling switch are all readily available to the questionee. The housing 71 is compact and of light weight and need merely be plugged into the usual telephone outlet via a three wire flexible cable 72 through which the telephone lines extend and terminate in a telephone plug 73. The earpiece 51 extends from the housing 71 in a suitable manner.

FIG. 6 is a circuit arrangement which may be utilized as the ten position signalling device or switching circuit of FIGS. 2 and 3. Although the circuit arrangement of FIG. 6 is indicated as functioning by grounding combinations of diodes, it may, of course, be connected to function by removal of ground from combinations of diodes.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means;

a central station comprising transducer means for converting sound to audio electrical energy, a source of electrical energy and recording means for recording electrical signals;

switchboard means; and electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means.

2. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means, the control means of each of said response arrangements including relay means having a contact connected to said indicating means and controlled by said relay means to selectively energize and deenergize said indicating means;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means; and connecting means connecting the relay means of each of said response arrangements to said wire means.

3. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means, the control means of each of said response arrangements including relay means having a first contact connected to said indicating means and controlled by said relay means to selectively energize and deenergize said indicating means and another contact connected to said line switching means and controlled by said relay means to determine the ground condition of said line switching means;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means; and connecting means connecting the relay means of each of said response arrangements to said wire means.

4. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means, said electrically conductive wire means comprising a plurality of telephone wire means connecting said switchboard means to each of said response arrangements, each of said telephone wire means including a Tip line and a Ring line; and impedance matching transformer means in each of said response arrangements coupling the transducer means of each of said response arrangements to said telephone wire means, each of said transformer means including a first primary winding connected to the Tip line of said telephone wire means, a second primary winding connected to the Ring line of said telephone wire means and a secondary winding connected to the said transducer means.

5. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means, the control means of each of said response arrangements including relay means having a first contact connected to said indicating means and controlled by said relay means to selectively energize and deenergize said indicating means and another contact connected to said line switching means and controlled by said relay means to determine the ground condition of said line switching means and variable impedance means connected in series circuit arrangement with said relay means;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmsision of electrical signals of different selected polarities and polarity combinations from said selected ones of said response arrangements to said central station under the control of said control means, said electrically conductive wire means comprising a plurality of telephone wire means connecting said switchboard means to each of said response arrangements, each of said telephone wire means including a Tip line and a Ring line;

impedance matching transformer means in each of said response ararngements coupling the transducer means of each of said response arrangements to said telephone wire means, each of said transformer means including a first primary winding connected to the Tip line of said telephone wire means, a second primary winding connected to the Ring line of said telephone wire means and a secondary winding connected to the said transducer means; and connecting means connecting the series circuit arrangement of said relay means and said variable impedance means of each of said response arrangements between the Tip and Ring lines of said telephone wire means.

6. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means, the control means of each of said response arrangements including relay means having a first contact connected to said indicating means and controlled by said relay means to selectively energize and deenergize said indicating means and another contact connected to said line switching means and controlled by said relay means to determine the ground condition of said line switching means and a thermistor conconnected in series circuit arrangement with said relay means;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means, said electrically conductive wire means comprising a plurality of telephone wire means connecting said switchboard means to each of said response arrangements, each of said telephone wire means including a Tip line and a Ring line;

impedance matching transformer means in each of said response arrangements coupling the transducer means of each of said response arrangements to said telephone wire means, each of said transformer means including a first primary winding connected to the Tip line of said telephone wire means, a second primary winding connected to the Ring line of said telephone wire means and a secondary winding connected to the said transducer means; and connecting means connecting the series circuit arrangement of said relay means and said thermistor of each of said response arrangements between the Tip and Ring lines of said telephone wire means.

7. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means;

housing means housing each of said response arrangements with the transducer means, line switching means, indicating means and control means of each said response arrangement in accessible position;

a central station comprising transducer means for converting sound to audio electrical energy, a source of electrical energy and recording means for recording electrical signals;

switchboard means; and electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means.

8. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means, the control means of each of said response arrangements including relay means having a contact connected to said indicating means and controlled by said relay means to selectively energize and deenergize said indicating means;

housing means housing each of said response arrangements with the transducer means, line switching means, indicating means and control means of each said response arrangement in accessible position;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means; and connecting means connecting the relay means of each of said response arrangements to said wire means.

9. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means;

housing means housing each of said response arrangements with the transducer means, line switching means, indicating means and control means of each said response arrangement in accessible position;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said response arrangements are connected through said switchboard means to said central station to enable the transmission of audio signals and electrical energy from said central station to said selected ones of said response arrangements and to enable the transmission of electrical signals of different selected polarities and polarity combinations from said selected ones of said response arrangements to said central station under the control of said control means, said electrically conductive wire means comprising a plurality of telephone wire means connecting said switchboard means to each of said response arrangements, each of said telephone wire means including a Tip line and a Ring line; and impedance matching transformer means in each of said response arrangements coupling the transducer means of each of said response arrangements to said telephone wire means, each of said transformer means including a first primary winding connected to the Tip line of said telephone wire means, a second primary winding connected to the Ring line of said telephone wire means and a secondary winding connected to the said transducer means.

10. An interrogating system for interrogating selected ones of a plurality of response arrangements comprising, in combination, a plurality of response arrangements each comprising transducer means for converting audio electrical energy to sound, line switching means for providing different selected ground circuits to provide electrical signals of different selected polarities and polarity combinations, indicating means for indicating a circuit condition and control means for controlling the operable condition of each of said transducer means, said line switching means and said indicating means, the control means of each of said response arrangements including relay means having a first contact connected to said indicating means and controlled by said relay means to selectively energize and deenergize said indicating means and another contact connected to said line switching means and controlled by said relay means to determine the ground condition of said line switching means and variable impedance means connected in series circuit arrangement with said relay means;

housing means housing each of said response arrangements with the transducer means, line switching means, indicating means and control means of each said response arrangement in accessible position;

a central station comprising transducer means for converting sound to audio electrical energy, a source of electrical energy and recording means for recording electrical signals;

switchboard means;

electrically conductive wire means connecting said central station to said switchboard means and connecting said switchboard means to each of said response arrangements so that selected ones of said respnose arrangements are connected through said switchboard means to said central station to enable the transmission of audio signals and electrical energy from said central station to said slected ones of said response arrangements and to enable the transmission of electrical signals of different selected polarities and polarity combinations from said selected ones of said response arrangements to said central station under the control of said control means, said electrically conductive wire means comprising a plurality of telephone wire means connecting said switchboard means to each of said response arrangements, each of said telephone wire means including a Tip line and a Ring line;

impedance matching transformer means in each of said response arrangements coupling the transducer means of each of said response arrangements to said telephone wire means, each of said transformer means including a first primary winding connected to the Tip line of said telephone wire means, a second primary winding connected to the Ring line of said telephone wire means and a secondary winding connected to the said transducer means; and connecting means connecting the series circuit arrangement of said relay means and said variable impedance means of each of said response arrangements between the Tip and Ring lines of said telephone wire means.

References Cited by the Examiner

UNITED STATES PATENTS 3,126,513 3/64 Kamen ---------------- 179—2

DAVID G. REDINBAUGH, *Primary Examiner.*